(No Model.)

I. S. FREEMAN.
TRACTION ENGINE.

No. 282,299. Patented July 31, 1883.

WITNESSES:
C. Neveux
C. Sedgwick

INVENTOR:
I. S. Freeman
BY Munn & Co.
ATTORNEYS.

UNITED STATES PATENT OFFICE.

ISAAC S. FREEMAN, OF BALSAM LAKE, WISCONSIN.

TRACTION-ENGINE.

SPECIFICATION forming part of Letters Patent No. 282,299, dated July 31, 1883.

Application filed March 15, 1883. (No model.)

*To all whom it may concern:*

Be it known that I, ISAAC S. FREEMAN, of Balsam Lake, in the county of Polk and State of Wisconsin, have invented new and useful Improvements on Traction-Engine Carriages, of which the following is a full, clear, and exact description.

This invention relates to traction-engine carriages designed to be propelled by steam, in which a car carrying the propelling machinery and fuel is supported on and within a traction wheel or wheels by means of pinions or friction-wheels, and sheaves or guide-wheels arranged to bear against or engage with the inner peripheral portion of the traction wheel or wheels, that thus are made to rotate and travel over the ground by the pinions or friction-wheels of the car in their effort, as they are driven, to mount, with the car and its whole load, up the traction-wheels on either side of a vertical line passing through the axial line of the traction-wheels.

The invention consists in certain novel and advantageous arrangements of the several parts, in connection with the machinery or driving mechanism, whereby the entire load is carried on the inside of two large traction-wheels and confined by sheaves, guide wheels or rollers, so that the weight is placed at the greatest possible distance from the center of the traction-wheels, and in a frame of limited dimensions, so as to offer no obstruction in traveling over uneven roads, and allowing of the entire weight of the car, propelling machinery, fuel, and water to assist in a concentrated manner in holding the car low down, or at the bottom of the traction-wheels, and whereby a better propelling effect is obtained, motion more quickly communicated to the traction-wheels, and the adjustability of the load is made to apply the power with increased advantage in traveling over rough roads; the invention also including means for driving either one of the traction-wheels independently of the other, and dispensing with the usual forward guide-wheels of ordinary traction-wagons.

Reference is to be had to the accompanying drawings, forming part of this specification, in which similar letters of reference indicate corresponding parts in both the figures.

Figure 2:
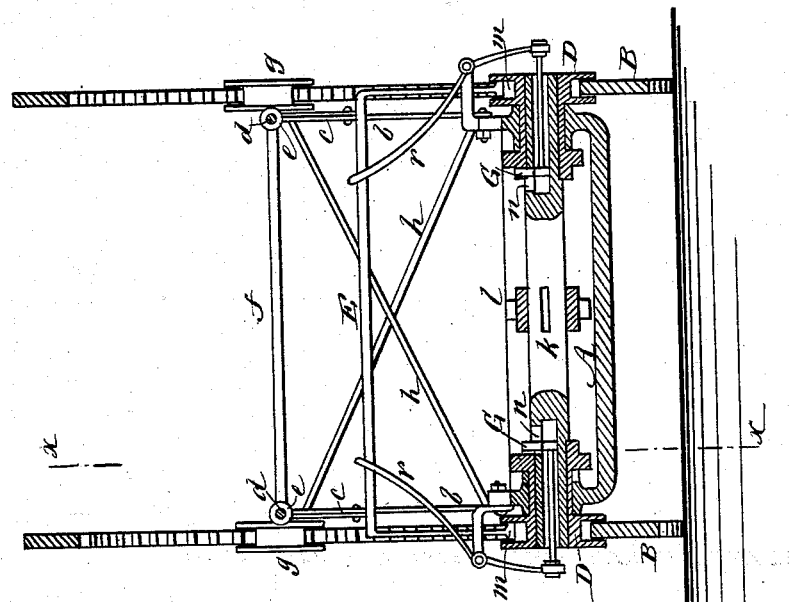
Figure 1:
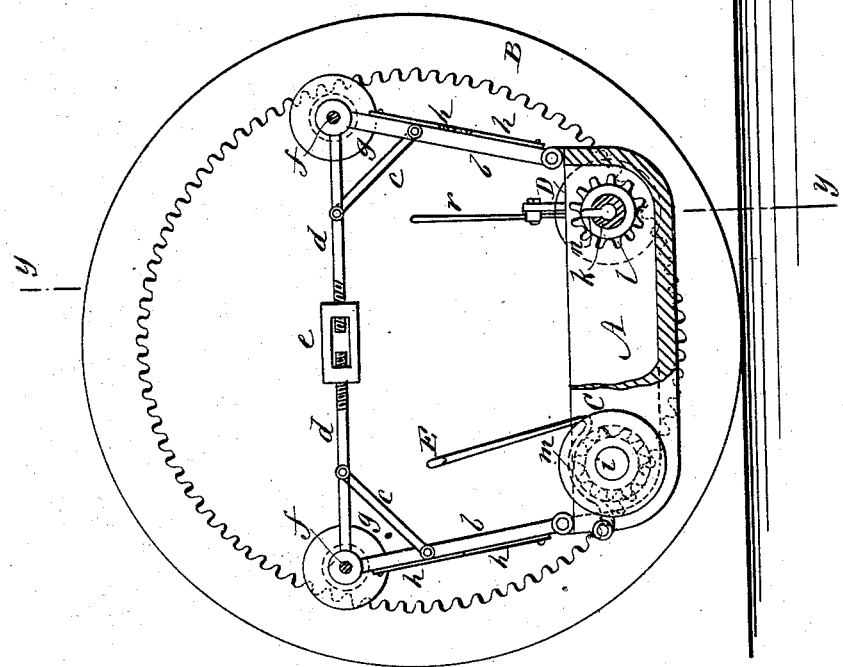

Figure 1 represents a part side view and vertical section, on the line $xx$ in Fig. 2, of a traction-engine carriage embodying my invention; and Fig. 2, a vertical section of the same on the irregular line $yy$ of Fig. 1.

A in the drawings indicates the car or car-body, from the opposite sides of which, at both ends of the car, are upwardly-projecting posts or frame-pieces $b\ b$, connected by braces $c\ c$ with top rails, $d\ d$, of the car-frame. These rails $d$ are each made of two longitudinal sections, with right and left hand screw-threads on their inner ends, and united by a screw turn-buckle, $e$.

B B are the two large traction-wheels, or "rings," as they might be termed, inasmuch as they have no spokes, said wheels being arranged parallel with each other on opposite sides of the car. The rails $d\ d$ are arranged only slightly above the axial center of the wheels B B, and carry at their ends shafts $f\ f$, upon which are loosely arranged flanged guide sheaves or rollers $g\ g$, that thus are placed at a considerable distance from each other and from the axial center of the traction-wheels. These flanged rollers bear freely against and receive within them the inner peripheral portions of the wheels B B, and form loose guides for the car, and serve to keep the car-body A down on the track or inner peripheral portion of the wheels B B, in the bottom portion of which the car-body rests.

By turning the screw turn-buckles $e$, the flanged rollers $g\ g$ may be adjusted in or out relatively to the rim of the wheels B B.

The ends of the car-frame may, if desired, be stiffened by cross-braces $h\ h$.

The car-body A, which is designed to carry both the driving machinery and necessary fuel and water, is also provided on opposite sides and at its opposite ends with flanged guide-wheels C D, that similarly hug the inner peripheral portion of the wheels B B, and from the shafts $i\ k$ of which the car-body may be suspended. The shaft $k$, which is hollow, is the driving-shaft, and may be driven by gear through a pinion, $l$, or otherwise, and the flanged wheels D, which are the drivers of the wheels B B, are loose upon said shaft. These wheels D may either be plain or toothed, and the inner peripheral portions of the wheels B B also be either plain or toothed, accordingly as it is desired to drive by simple friction or by toothed gear. The flanged wheels C are merely guide and brake wheels, and are fitted loose on their shaft $i$; also are provided with brakes $m$, which may be operated by a lever-frame, E, or otherwise, to assist in handling and controlling the carriage. Either one or other, or both, of the wheels D may be put into or out of action, accordingly as it is required to apply the driving-power to either or both, simultaneously, of the traction-wheels B B by means of clutches G G, arranged to work within the hollow shaft $k$, and through slots $n$ $n$ therein, so as to engage with or disengage from suitably-shaped recessed ends of the sleeve-like extensions of the wheels D, said clutches being controlled by separate hand-levers $r$ $r$.

The invention is not restricted to any particular number of flanged guide wheels or rollers; but the arrangement of them here shown is preferred, as by such a very steady run is obtained. The weight, too, of the whole load, including machinery, water, and fuel, is kept at the very lowest possible point in the traction-wheels, or at the greatest distance from their axial center, and the car-frame is only of limited dimensions.

Having thus described my invention, I claim as new and desire to secure by Letters Patent—

1. In a steam or power traction-carriage, the combination, with the traction-wheels or rings, of the car-body, having the flanged wheels, adapted to engage with the rings, and the upper sets of wheels, also capable of engagement with the rings, and arranged above the center of the rings, said upper sets of wheels being connected to the corners or sides of the car-body by inclined connections, and together by horizontal connections, substantially as and for the purpose set forth.

2. The combination, with the traction-wheels B B and car or car-body A, arranged for operation in relation with said wheels, as described, of the driving-shaft $k$, independent loose driving-wheels D D on said shaft, and independent clutches G G, for throwing said wheels in or out of gear with said shaft, essentially as described.

3. The combination, with the traction-wheels B B and car or car-body A, having driving-wheels D D, of loose lower guide-wheels, C, and brakes $m$, applied thereto essentially as herein set forth.

4. The combination, with the traction-wheels or rings B B and car-body A, with its lower guide and driving wheels, C D, of the upper guide wheels or rollers, $g$ $g$, and the sectionally-constructed upper rails, $d$ $d$, of the car-frame, and the connecting screw turn-buckles $e$, the whole being arranged for operation essentially as specified.

ISAAC S. FREEMAN.

Witnesses:
J. STANNARD BAKER,
GEORGE G. HARVEY.